United States Patent [19]
Kawakami et al.

[11] Patent Number: 5,728,482
[45] Date of Patent: Mar. 17, 1998

[54] SECONDARY BATTERY AND METHOD FOR MANUFACTURING THE SAME

[75] Inventors: Soichiro Kawakami; Naoya Kobayashi, both of Nara; Masaya Asao, Tsuzuki-gun, all of Japan

[73] Assignee: Canon Kabushiki Kaisha, Tokyo, Japan

[21] Appl. No.: 770,802

[22] Filed: Dec. 20, 1996

[30] Foreign Application Priority Data

Dec. 22, 1995 [JP] Japan .................................. 7-349549

[51] Int. Cl.⁶ .................................................. H01M 4/62
[52] U.S. Cl. .......................... 429/10; 429/218; 29/623.1
[58] Field of Search ...................... 429/10, 218; 29/623.1

[56] References Cited

FOREIGN PATENT DOCUMENTS 63-13264    1/1988    Japan .
63-114057   5/1988    Japan .
5-47381     2/1993    Japan .
05140785    6/1993    Japan .
5-190171    7/1993    Japan .
5-234585    9/1993    Japan .

OTHER PUBLICATIONS

Journal of Applied Electrochemistry, vol. 22, No. 7, Jul. 1992, pp. 620–627, N. Kumagai et al., "Cycling Behaviour of Lithium–Aluminium Alloys Formed on Various Aluminium Substrates as Negative Electrodes in Secondary Lithium Cells".

*Primary Examiner*—M. Nuzzolillo
*Attorney, Agent, or Firm*—Fitzpatrick, Cella, Harper & Scinto

[57] ABSTRACT

In a secondary battery including at least an anode, a cathode, an electrolyte and a battery housing, a magnetic-field generation unit for generating magnetic lines of force, orthogonal to an electric field during charging, at least on the surface of the anode is provided.

16 Claims, 7 Drawing Sheets

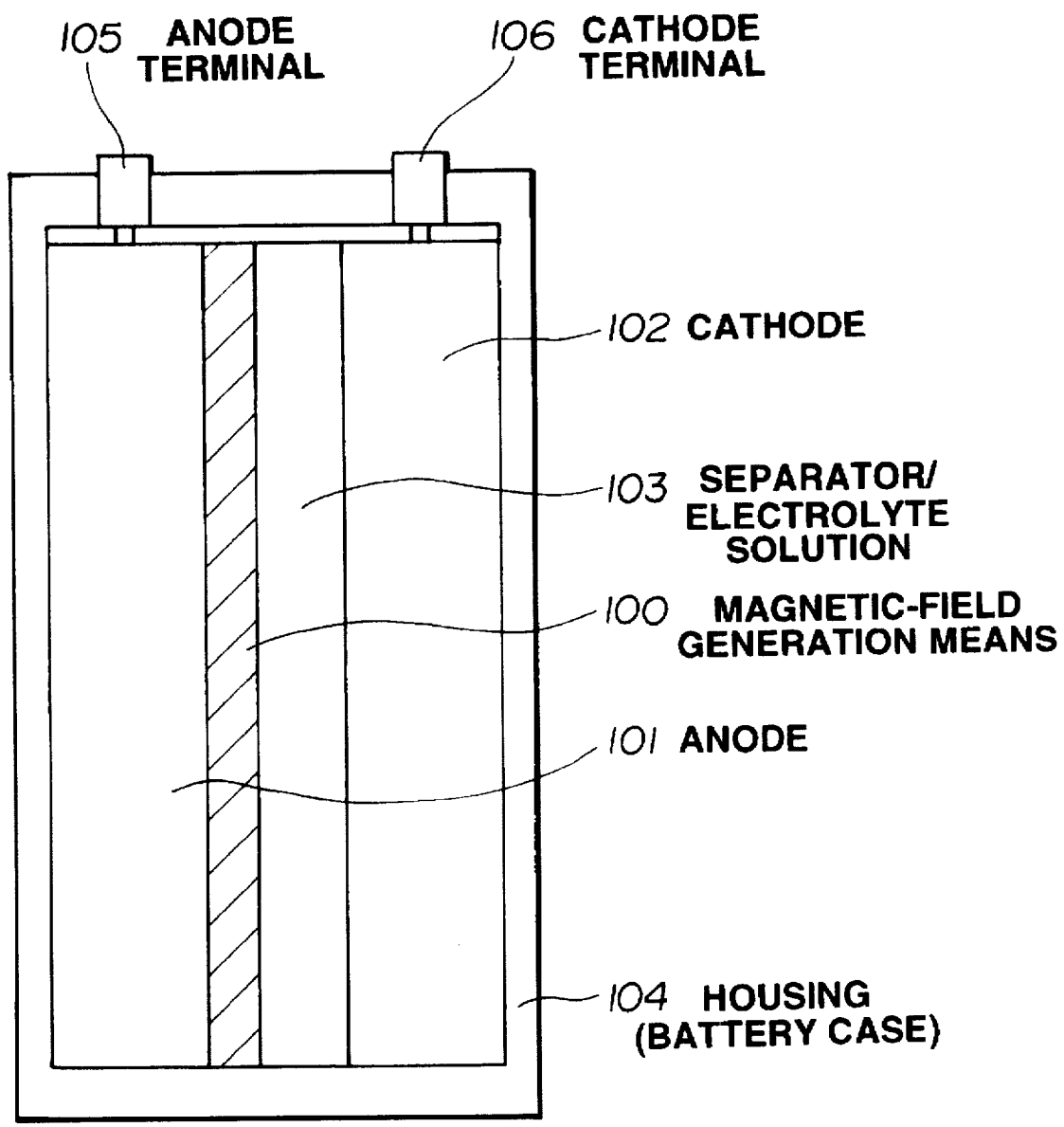

SECONDARY BATTERY AND METHOD FOR MANUFACTURING THE SAME

BACKGROUND OF THE INVENTION

1. Field of the Invention

This invention relates to a secondary battery, particularly, to a secondary battery which suppresses the generation of dendritic deposition in lithium metal or zinc metal during repetition of charging/discharging, and to a method for manufacturing the secondary battery.

2. Description of the Related Art

Recently, the possibility of an increase in the earth's temperature due to the greenhouse effect caused by an increase in the amount of $CO_2$ gas included in the atmosphere has been pointed out. Since thermal power plants, which burn fossil fuel and convert obtained thermal energy into electric energy, discharge a large amount of $CO_2$ gas, it becomes more and more difficult to construct new thermal power plants. Accordingly, in order to effectively utilize electric power generated by generators, such as thermal power plants and the like, so-called load leveling is being proposed in which night power, serving as dump power, is stored in secondary batteries installed in general houses and is used during day time where electric power consumption is large to level the load.

In the field of electric vehicles having the feature of not emitting substances causing air pollution, such as COx, NOx, hydrocarbons and the like, the development of high-energy-density secondary batteries has been expected. In the field of power supplies for portable devices, such as book-size personal computers, word processors, video cameras, portable telephone sets and the like, the development of small, light and high-performance secondary batteries has been urgently requested.

As such small, light and high-performance secondary batteries, so-called "lithium-ion batteries" of a rocking-chair type, which use a lithium-intercalation compound in which lithium ions are deintercalated from between layers in reaction during charging, and a carbonous material represented by graphite in which lithium ions can be intercalated between layers of a plane having the shape of a six-membered-ring network formed by carbon atoms as an anode material, have been developed and partially put into practical use.

In the "lithium-ion battery", however, since the anode made of a carbonous material can theoretically intercalate only ⅙ lithium atom per carbon atom at most, a high-energy-density secondary battery which copes with a lithium primary battery using metallic lithium as the anode material has not yet been realized. If it is intended to intercalate more amount of lithium than a theoretical amount in an anode made of carbonous material of the "lithium-ion battery" during charging, or if charging is performed under the condition of a high current density, dendritic lithium metal grows on the surface of the anode of the carbonous material, in some cases, finally being liable to cause internal short circuit between the anode and the cathode during repetition of a charging/discharging cycle. As a result, a cycle life which is sufficient for practical use has not yet been obtained in a "lithium-ion battery" exceeding the theoretical capacity of the graphite anode. In addition, charging at a high current density of the same level as in a known secondary battery using an aqueous hydrolytic solution cannot be performed;

High-capacity lithium secondary batteries using metallic lithium as the anode are attracting attention as high-energy-density secondary batteries, but are not yet practically used. The reason why such batteries are not practically used is that the cycle life of charging/discharging is extremely short. The inventors of the present invention suppose from various results of experiments that the cycle life of charging/discharging of such batteries is extremely short mainly because metallic lithium reacts on impurities, such as water and the like, in the electrolytic solution, and the organic solvent to form an insulating film, or the surface of the metallic lithium foil is not flat and therefore the electric field is concentrated on some portions, thereby causing the growth of dendritic lithium metal during repetition of charging/discharging, and shortening the life due to internal short circuit between the anode and the cathode.

When the anode is short circuited to the cathode due to the growth of the dendritic lithium metal, the energy of the battery is consumed at the short circuited portion, thereby, in some cases, heating the battery, or generating a gas by the thermal decomposition of the solvent of the electrolyte solution to increase the internal pressure of the battery. Anyway, a damage of the battery or a decrease in the life of the battery is apt to occur due to the growth of the dendrite.

In order to suppress reaction between metallic lithium, and water and the organic solvent within the electrolyte solution which is a problem in a secondary battery using metallic lithium as the anode, a method of using a lithium alloy made of lithium, aluminum and the like as the anode has been proposed. This approach, however, has not yet been widely put into practical use because of the following reasons. First, since such a lithium alloy is hard, it cannot be spirally wound, and therefore a spiral cylindrical battery cannot be manufactured. In addition, the cycle life of a battery using such an alloy is not sufficiently lengthened, and an energy density which copes with that of a battery using metallic lithium as the anode is not obtained.

Proposals of using various kinds of lithium alloys for the anode are disclosed in Japanese Patent Laid-Open Application (Kokai) Nos. 5-190171 (1993), 5-47381 (1993), 63-114057 (1988) and 63-13264 (1988), and a battery which suppresses the deposition of dendrite by uniformly depositing metallic powder having a property of hardly forming an intermetallic compound with lithium on the surface of lithium to increase the charging efficiency and the cycle life is disclosed in Japanese Patent Laid-Open Application (Kokai) No. 5-234585 (1993). These proposals, however, cannot provide a definitive approach for greatly increasing the life of the anode.

A lithium secondary battery using an aluminum foil having an etched surface as the anode is described in "Journal of Applied Electrochemistry" 22 (1992), pp. 620–627. In this approach, however, when repeating a charging/discharging cycle to a practical range, the aluminum foil repeats expansion and contraction to produce cracks, thereby degrading the charge-collecting property. In addition, the growth of dendrite occurs. Hence, in this approach, also, a cycle life applicable to a practical level cannot be obtained.

In secondary batteries comprising nickel-zinc batteries or air-zinc batteries, also, in some cases, the dendritic deposition of zinc metal, serving as the anode material, is liable to be produced due to the repetition of charging/discharging and threads through the separator to cause short circuit between the zinc anode and the cathode, thereby shortening the cycle life.

Accordingly, in lithium secondary batteries (secondary batteries utilizing the intercalation/deintercalation reaction of lithium ions in an electrode due to charging/discharging, including "lithium-ion batteries" using a carbonous material as the anode, will be hereinafter termed "lithium secondary batteries") and zinc secondary batteries (secondary batteries using zinc as the anode material will be hereinafter termed "zinc secondary batteries"), an increase in the energy density and an increase in the cycle life have been strongly requested.

SUMMARY OF THE INVENTION

The present invention has been made in consideration of the above-described problems.

It is an object of the present invention to provide a secondary battery having a long cycle life and a high energy density comprising lithium or zinc as an anode active material, and a method for manufacturing such a secondary battery.

According to one aspect, the present invention which achieves the above-described object relates to a secondary battery including at least an anode, a cathode, an electrolyte and a battery housing, comprising magnetic-field generation means for generating magnetic lines of force, orthogonal to an electric field during charging, at least on the surface of the anode.

According to another aspect, the present invention which achieves the above-described object relates to a method for manufacturing a secondary battery including at least an anode, a cathode, an electrolyte and a battery housing, comprising the steps of mixing a magnetic material with an anode material and molding the resultant material to form the anode, forming the cathode, and disposing the anode obtained in the anode forming step, the cathode obtained in the cathode forming step, and the electrolyte within the battery housing.

According to still another aspect, the present invention which achieves the above-described object relates to a method for manufacturing a secondary battery including at least an anode, a cathode, an electrolyte and a battery housing, comprising the steps of forming the anode, forming a layer made of a magnetic material on the anode, forming the cathode, and disposing the anode including the layer made of the magnetic material obtained in the layer forming step, the cathode obtained in the cathode forming step, and the electrolyte within the battery housing.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 1 is a cross-sectional view illustrating the configuration of one embodiment of a secondary battery according to the present invention;

DETAILED DESCRIPTION OF THE PREFERRED EMBODIMENTS

The surface of the anode (or a negative electrode in a battery) of a secondary battery is not uniformly flat, but has, in some cases, projections and recesses, and protruded portions. When a voltage is applied between the cathode (or a positive electrode in a battery) and the anode in such a battery, there is the possibility that portions where the strong electric field is concentrated are provided. When the anode active material comprises lithium or zinc, the current density increases during charging at portions where the intensity of the electric field is large, thereby facilitating the growth of dendrite. In some cases, a nonuniform insulating film is formed on the surface of the anode due to the reaction on the impurities and the electrolyte solution in the atmosphere of the manufacture of the battery. For example, when a lithium metallic foil is used for the anode, an insulating film comprising lithium oxide, lithium carbonate, lithium hydroxide or the like, is formed by reaction on a small amount of oxygen, carbon dioxide and water.

The inventors of the present invention have found that by generating a magnetic field orthogonal to the electric field on the surface of the anode, the electric field concentrated on the surface of the anode having protruded portions or on the surface of the anode covered with a non-uniform insulating film is disturbed, and the growth of dendrite (i.e., dendrite of the anode active material) deposited in the anode during charging can be suppressed by the Lorentz force.

In this specification, "an active material" means a material which participates in a repetion of an electrochemical reversible reaction during charging and discharging in a battery, and includes a substance which is capable of holding the other material participating in the electrochemical reversible reaction.

Experiments in which the effect of the magnetic field to suppress the growth of dendrite of the anode active material during charging will now be described in detail.

Figure 5:
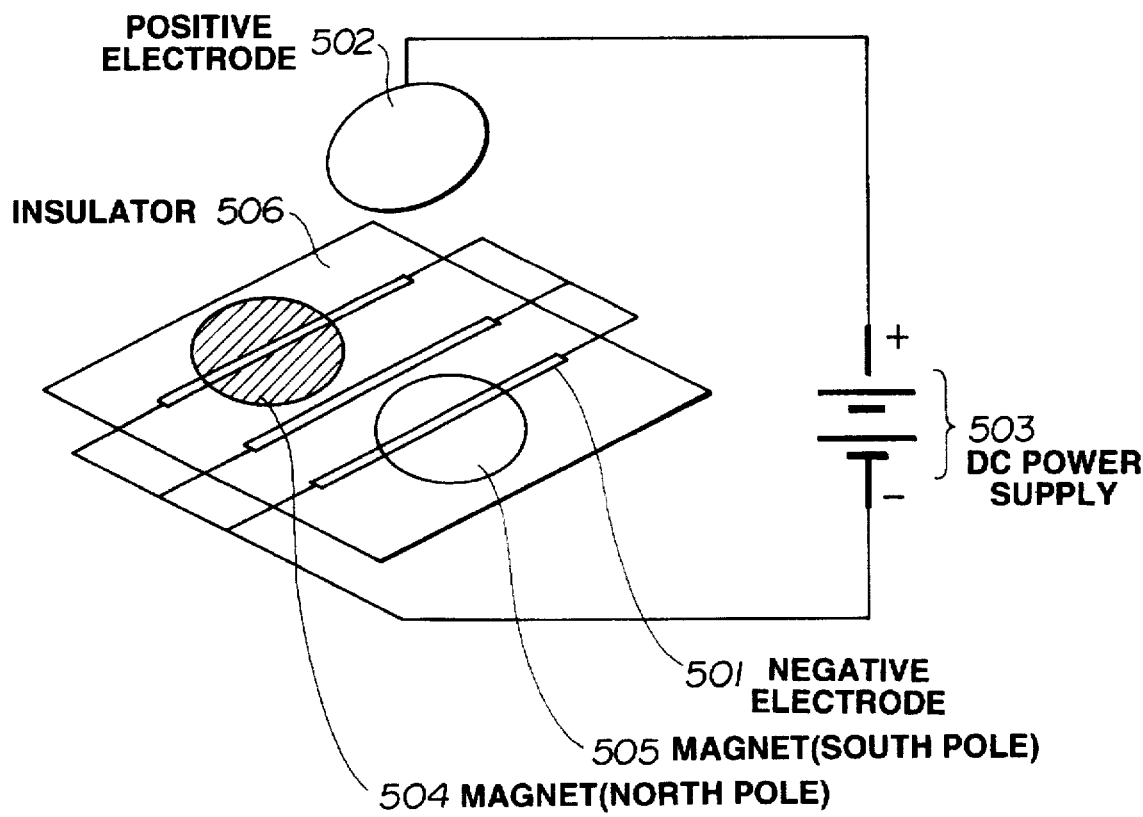
FIGS. 5 and 6 are schematic diagrams, each illustrating a device for a model experiment for confirming the effect of the magnetic field when an anode active material is deposited on the surface of a negative electrode.
Figure 6:
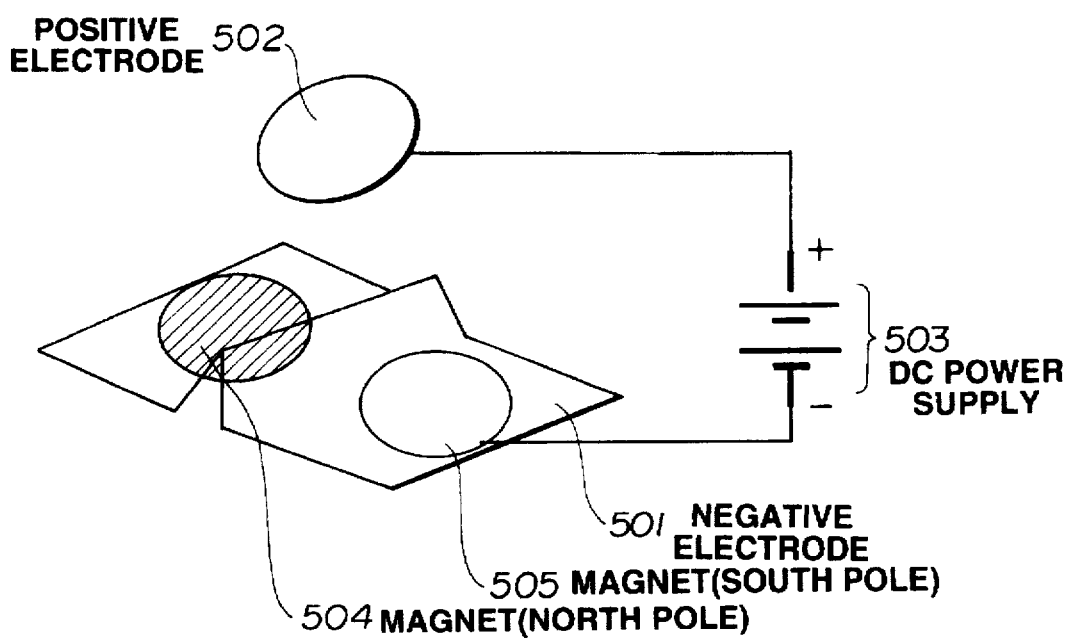

FIGS. 5 and 6 are schematic diagrams, each illustrating the configuration of a device for investigating the effect of the magnetic field on the dendritic deposition of the anode active material during charging.

FIG. 5 supposes the surface of an anode (an anode in the battery, or a negative electrode) covered with a non-uniform insulating film. A negative electrode formed by arranging three copper wires on an insulator 506, such as a fluororesin plate, is supposed to be a negative electrode (or a cathode in electrolysis) 501, and an electrode comprising an active-material layer, made of lithium-cobalt oxide, formed on an aluminum foil is used as a positive electrode (or an anode in electrolysis) 502. A north-pole magnet 504 and a south-pole magnet 505 are disposed under the copper wires at both ends of the cathode electrode in order to generate magnetic lines of force orthogonal to electric lines of force travelling from the positive electrode to the central copper wire of the negative electrode. Although not illustrated, a propylene-carbonate solution of 1M (mol/l) of lithium borate tetrafluoride is filled between the negative electrode and the positive electrode as an electrolyte solution. Reference numeral 503 represents a DC power supply for applying a voltage between the negative electrode 501 and the positive electrode 502.

FIG. 6 supposes the surface of an anode (an anode in the battery, or a negative electrode) having a protruded portion. A nickel foil whose central portion is protruded by being folded is used as a negative electrode 501. Other components are the same as those shown in FIG. 5.

Figure 7:
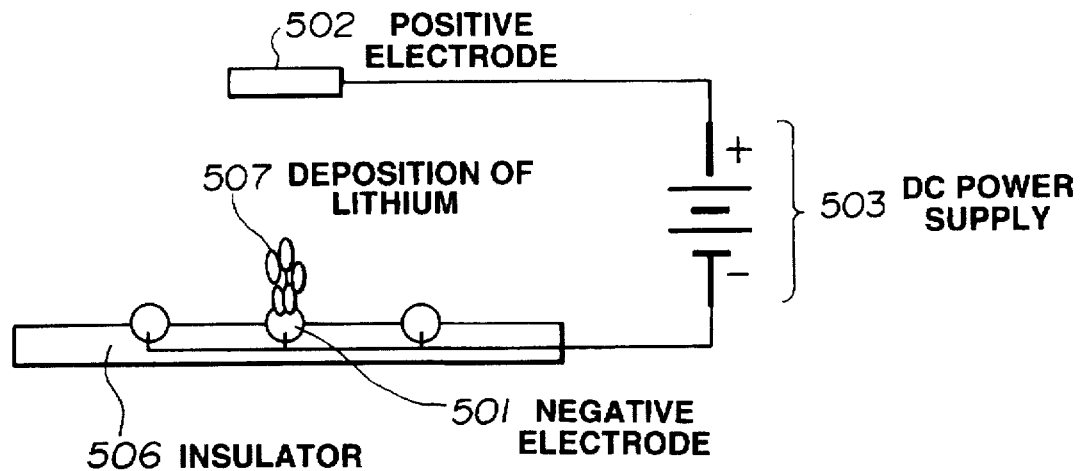
FIG. 7 is a schematic diagram illustrating a result of observation when an anode active material is deposited on the surface of a negative electrode.

FIG. 7 is a schematic diagram illustrating a result of observing the deposition of lithium (metal) 507 on the copper-wire negative electrode 501 from a side portion when a voltage is applied between the negative electrode 501 and the positive electrode 502 in a state in which the magnets 504 and 805 for generating the magnetic field are not provided in the configuration shown in FIG. 5. The deposition of dentritic lithium on the surface of the central copper wire facing the positive electrode 502, from among the three copper wires of the negative electrode 501, where electric lines of force are supposed to be concentrated is observed.

Figure 8:
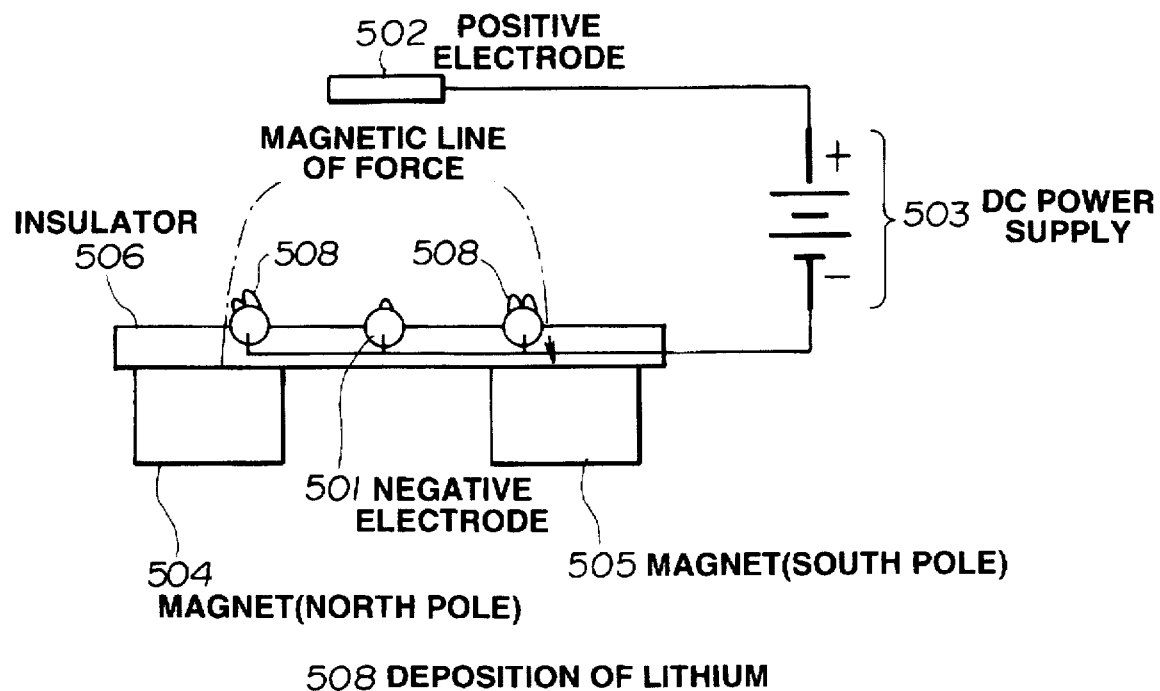
FIG. 8 is a schematic diagram illustrating a result of observation when an anode active material is deposited on the surface of a negative electrode under the presence of a magnetic field orthogonal to the electric field.

FIG. 8 is a schematic diagram illustrating a result of observing the deposition of lithium (metal) 508 on the copper-wire negative electrode 501 from a side portion when a voltage is applied between the negative electrode 501 and the positive electrode 502 in the configuration shown in FIG. 5. The deposition of lithium dendrite on the surface of the central copper wire of the negative electrode 501 where the the vectors of electric lines of force are orthogonal to the vectors of magnetic lines of force is suppressed, and the deposition of lithium 508 on copper wires at both ends of the negative electrode 501 where the direction of the vectors of electric lines of force coincides with the direction of the vectors of magnetic lines of force is clearly observed.

Figure 9:
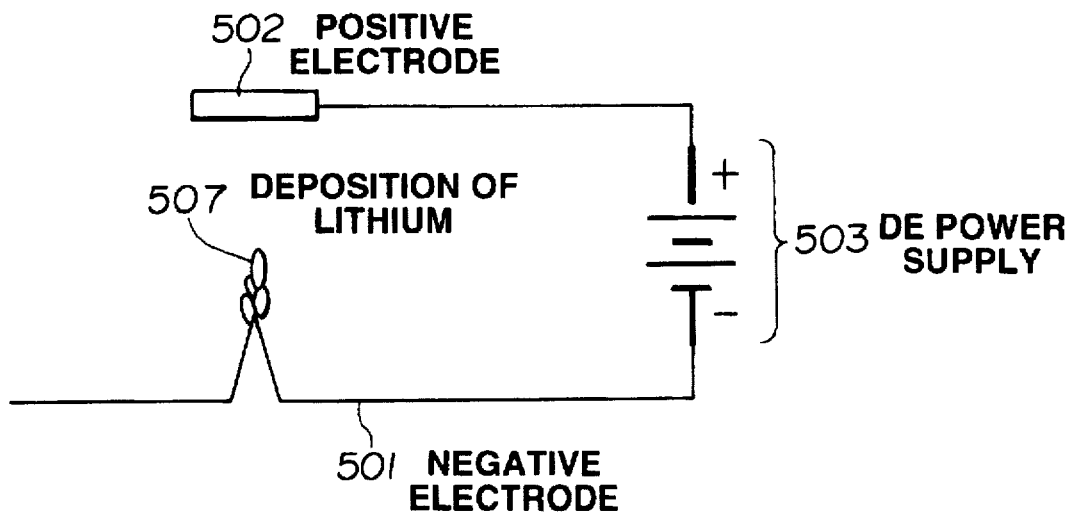
FIG. 9 is a schematic diagram illustrating a result of observation when an anode active material is deposited on the surface of a negative electrode.

FIG. 9 is a schematic diagram illustrating a result of observing the deposition of lithium (metal) 507 on the nickel-foil negative electrode 501 from a side portion when a voltage is applied between the negative electrode 501 and the positive electrode 502 in a state in which the magnets 504 and 505 for generating the magnetic field are not provided in the configuration shown in FIG. 6. The deposition of dentritic lithium on the surface of the central projection of the nickel foil where electric lines of force are supposed to be concentrated is observed.

Figure 10:
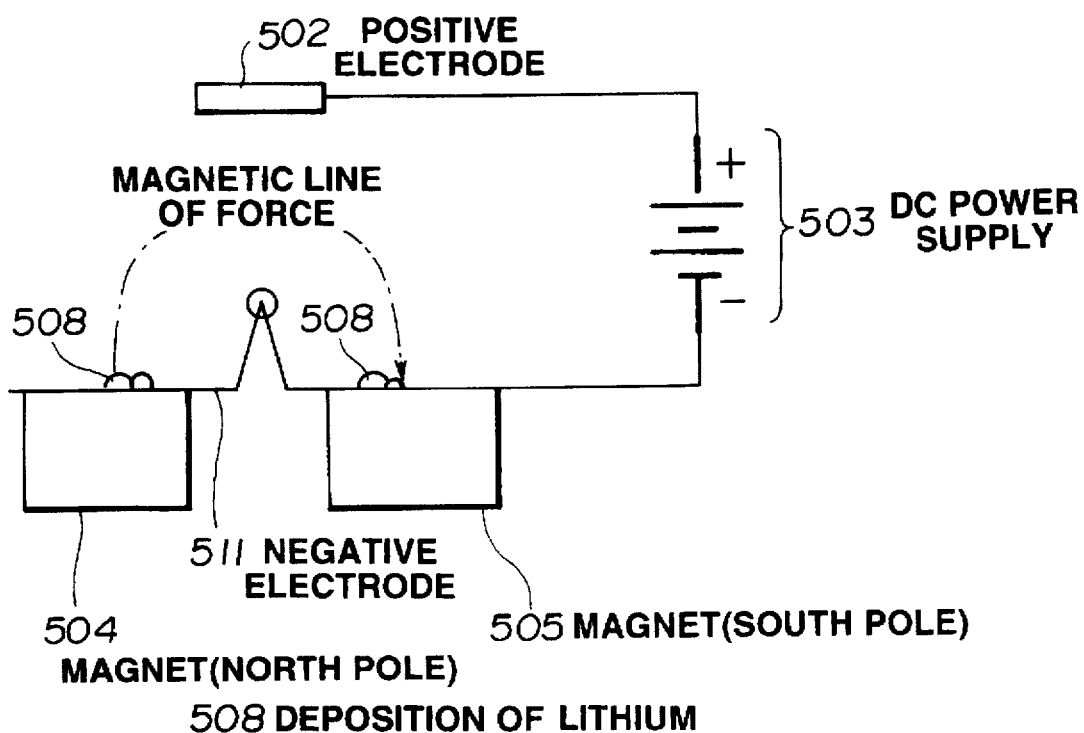
FIG. 10 is a schematic diagram illustrating a result of observation when an anode active material is deposited on the surface of a negative electrode under the presence of a magnetic field orthogonal to the electric field.

FIG. 10 is a schematic diagram illustrating a result of observing the deposition of lithium (metal) 508 on the nickel-foil negative electrode 501 from a side portion when a voltage is applied between the negative electrode 501 and the positive electrode 502 in the configuration shown in FIG. 6. The deposition of lithium dendrite on the surface of the central projection of the nickel foil where the vectors of electric lines of force are orthogonal to the vectors of magnetic lines of force is suppressed, and the deposition of lithium 508 on flat portions at both ends of the negative electrode 501 where the direction of the vectors of electric lines of force coincides with the direction of the vectors of magnetic lines of force is clearly observed.

The above-described results of the model experiments suggest that, even when applying a voltage to a secondary battery from the outside, by providing magnetic-field generation means for generating magnetic lines of force orthogonal to electric lines of force at a portion where the electric field is concentrated, unevenness in the intensity of the electric field in the vicinity of the surface of the anode caused by a nonuniform insulating film or a projection formed on the surface of the anode can be reduced, and the deposition of a dendritic anode active material during charging can be suppressed.

Furthermore, the inventors of the present invention have obtained, based on the above-described results of the model experiments, a result of lengthening the charging/discharging cycle life by incorporating an anode including magnetic-field generation means in a secondary battery.

In the secondary battery of the present invention, by providing magnetic-field generation means for generating magnetic lines of force orthogonal to the electric field during charging at least on the surface of the anode based on the above-described knowledge, the deposition of dendritic lithium or zinc on a portion on the surface of the anode where electric lines of force are concentrated, such as a conductive projection or the like, can be suppressed by reducing portions on the surface of the anode where the electric field is concentrated by disturbing the electric lines of force using a magnetic force. As a result, lithium or zinc can be uniformly deposited during charging, and the growth of dendrite is suppressed. Accordingly, the cycle life of a secondary battery using lithium or zinc as the anode active material can particularly be lengthened. It is thereby possible to realize high-energy-density secondary batteries, such as lithium batteries, nickel-zinc batteries, air-zinc batteries, bromine-zinc batteries and the like.

In the secondary battery of the present invention, means for generating a magnetic field on the surface of the anode can be formed by magnetizing a magnetic material disposed on the anode. It is thereby possible to form magnetic-field generation means with a low cost without providing a complicated mechanism. Furthermore, it is possible to manufacture a secondary battery having a long charging/discharging cycle life with only a small increase in cost.

A used secondary battery of the present invention can be recycled. When recycling a used battery by decomposing it and selecting materials, the anode having means for generating a magnetic field can be easily selected utilizing a magnetic force.

Figure 2A:
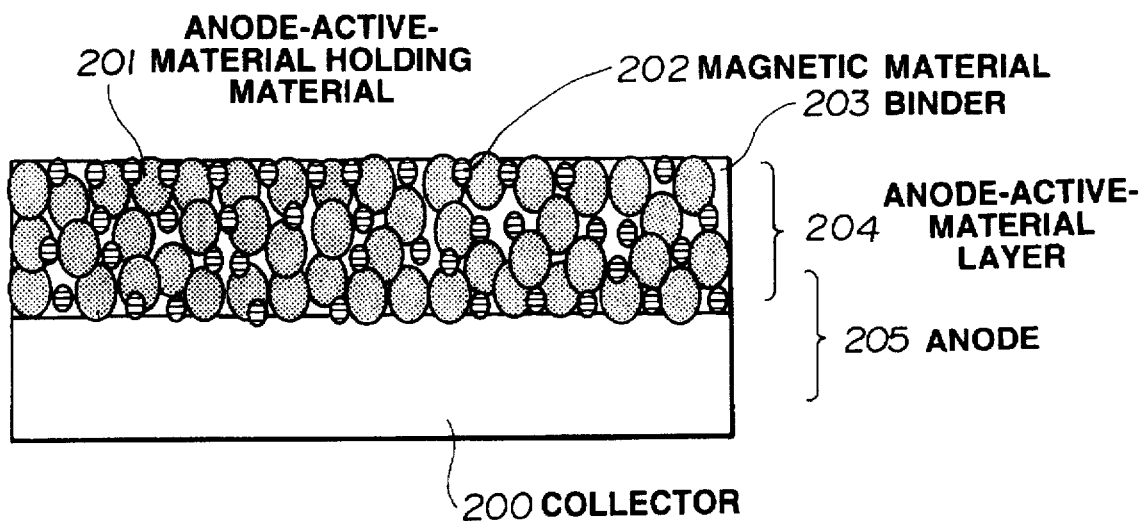
FIGS. 2(a) and 2(b) are cross-sectional views, each illustrating the configuration of one embodiment of an anode according to the invention.
Figure 2B:
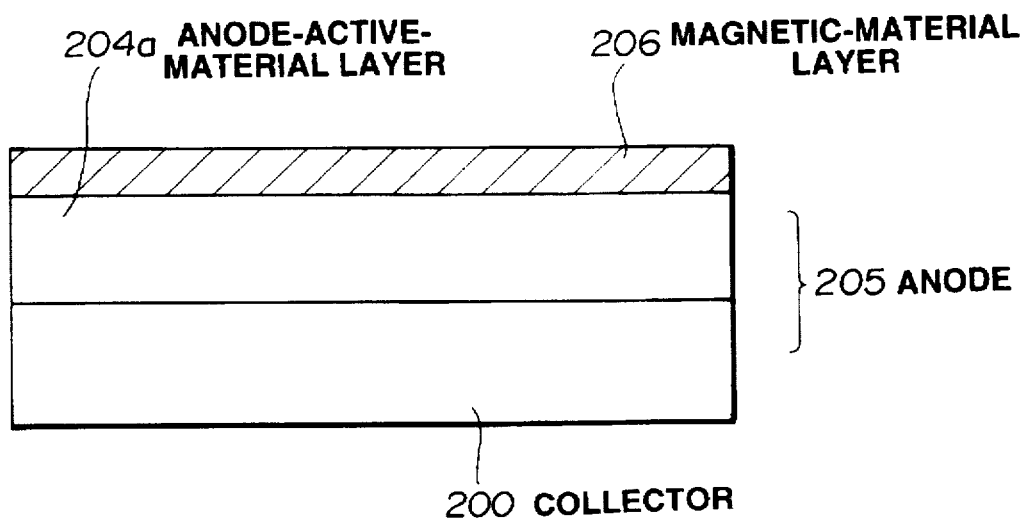

A description will now be provided of secondary batteries according to the present invention with reference to FIGS. 1 through 2(b).

FIG. 1 is a schematic cross-sectional view of one embodiment of a secondary battery according to the invention. In FIG. 1, an anode 101 and a cathode 102 face each other via a separator/electrolyte solution (a separator holding an electrolyte solution) 103, and magnetic-field generation means 100 is provided on the surface of the anode 101. These components are accommodated within a housing (a battery case) 104. The anode 101 and the cathode 102 are connected to an anode terminal 105 and a cathode terminal 106, respectively. The magnetic-field generation means 100 disturbs the electric field in the vicinity of the surface of the anode 101 when a charging voltage is applied between the anode 101 and the cathode 102. It is thereby possible to homogenize the deposition of an anode active material by means of the Lorentz force to suppress the deposition of dendrite, and thereby to lengthen the cycle life of the battery.

FIGS. 2(a) and 2(b) are schematic diagrams, each illustrating the cross section of an anode used in a secondary battery of the present invention. An anode 205 shown in FIG. 2(a) comprises an anode-active-material layer 204, comprising an anode-active-material holding material 201, a magnetic material 202 and a binder 203, provided on a current collector 200. When such an anode is incorporated within a secondary battery, an electrolytic solution, a separator and a cathode are disposed at the side of the anode-active-material layer 204 of the anode 205.

The anode-active-material holding material indicates a material where an anode active material which participates in electrochemical reversible reaction is deposited or intercalated during charging. More specifically, a conductive material, such as metal or the like, or a carbon material represented by graphite is used as the anode-active-material holding material.

In FIG. 2(b), an anode 206 comprises an anode-active-material layer 204a, comprising an anode-active-material holding material, and a magnetic-material layer 206 formed on a collector 200 in this sequence. The magnetic-material layer 206 may be formed, for example, by dispersing a magnetic material in a polymer material capable of passing ions relating to the battery reaction.

The magnetic material used for the magnetic-field generation means must be magnetized in a state of being incorporated in the secondary battery.

Next, a description will be provided of respective materials used in the secondary battery of the present invention.
Magnetic materials (202 shown in FIG. 2(a) and 206 shown in FIG. 2(b))

As means for generating a magnetic field used in the anode of the secondary battery of the present invention, it is preferable to dispose a magnetic material on the surface of or within the anode and to magnetize the magnetic material so as to provide a magnetic field orthogonal to the electric field on the surface of the anode. It is preferable to use a hard magnetic material called a permanent-magnet material as the magnetic material. A semihard magnetic material may also be used in the present invention.

For example, a rare-earth magnet made of $SmCo_5$, $Sm_2Co_{17}$, $Fe_{14}Nd_2B$ or the like, a ferrite magnet made of barium ferrite ($BaO.6Fe_2O_3$), strontium ferrite or the like, an alnico magnet made of an alloy, such as $Co_{24}Ni_{14}Al_8Fe$ or the like having aluminum as a main component, a Fe-Cr-Co magnet made of $Fe_46Cr_{31}Co_{23}$ or the like, a MnAlC magnet, a Fe-Pt-type magnet or the like may be used as the permanent-magnet material capable of being used for the magnetic-field generation means of the present invention.

It is preferable to use a magnetic material exhibiting litle degradation due to oxidation during the charging/discharging cycle of the battery, such as a spinel-type ferrite including Mn or Co, or Co, Fe or Ni-type magnetic material. In order to suppress the growth of dendritic anode active material by generating a magnetic field without reducing the charge storage capacity of the anode, it is necessary to minimize the amount of the magnetic material. By using a fine-powder magnetic material, it is possible to uniformly disperse the magnetic material on the surface of or within the anode with a small amount. A fine-particle spinel-type ferrite having a particle size equal to or less than 10 nm can be prepared by a coprecipitation method or a hydrothermal method from an aqueous solution of a salt, or by pulverization. A fine-particle Co. Fe or N-type magnetic material having a particle size equal to or less than 5 nm can be prepared by performing processing according to a method of heating and decomposing a carbonyl compound of Fe or Co in an organic solvent to which a surfactant is added, a method of evaporating a metal by rotating a vacuum drum containing a solvent, such as oil or the like, an arc discharge method, a CVD (chemical vapor deposition) method, a gas atomization method or the like. Magnetic fine particles having magnetite ($Fe_3O_4$) extracted by cultivating magnetotactic bacteria (aquaspirillum magnetotacticum) as a main component may also be used as the magnetic material.

Preparation of an anode having means for generating a magnetic field

Means for generating a magnetic field is preferably formed in a state of contacting or being incorporated within an anode. An anode having means for generating a magnetic field is prepared, for example, according to the following methods.

In one method, such an anode is formed by coating the surface of an anode with a material comprising a magnetic material or by mixing a magnetic material in a material constituting an anode, and then magnetizing the magnetic material.

In another method, such an anode is formed by mixing a magnetic material in a material constituting an anode and molding the resultant material in a magnetic field. It is also possible to prepare such an anode by coating the surface of an anode with a magnetic material which has been magnetized in advance, or mixing such a magnetic material in a material constituting an anode, and molding the resultant material. In such a case, it is necessary not to use a material having a high permeability (e.g. ferrite) for a device for handling the magnetized magnetic material.

A more specific method for manufacturing an anode having magnetic-field generation means will now be described with reference to FIGS. 2(a) and First, a description will be provided of a method for manufacturing the anode having the structure shown in FIG. 2(a). Each numeral enclosed by a parenthesis indicates the order of preparation.

(1) The anode-active-material holding material 201 where an anode active material is deposited or intercalated during charging, the magnetic material 202 and the binder 203 are mixed in a solvent, and a conductive auxiliary agent is added if necessary, to prepare a paste.

(2) The paste prepared in process (1) is coated on the collector 200 to form the anode-active-material layer 204, which is dried at a reduced pressure to obtain the anode 205. If necessary, the thickness of the anode-active-material layer 204 is made to be uniform using a roll press.

(3) The magnetic material within the anode obtained in process (2) is magnetized using an electromagnet to obtain an anode having magnetic-field generation means.

A description will now be provided of a method for manufacturing the anode having the structure shown in FIG. 2(b). Each numeral enclosed by a parenthesis indicates the order of preparation.

(1) A structure obtained by forming the anode-active-material layer 204a, formed from the anode-active-material holding material 201 where the anode active material is deposited or intercalated during charging, on the collector 200 is prepared.

(2) A polymer material, a magnetic material, and a solvent for dissolving the polymer material are added and mixed to prepare a paste.

(3) The paste prepared in process (2) is coated on the anode-active-material layer 204a to form the magnetic-material layer 208, which is dried at a reduced pressure to obtain the anode 205. If necessary, the thickness of the anode-active-material layer 204a is made to be uniform using a roll press.

(4) The magnetic material provided on the anode in process (2) is magnetized using an electromagnet to obtain an anode having magnetic-field generation means.

The magnetizing processing in the above-described two manufacturing methods may be performed while the magnetic material is formed or after the magnetic material has been formed.

If the magnetic flux density on the surface of the prepared anode having the magnetic-field generation means is too low, the depostion of dendritic lithium on a portion where the electric field is concentrated cannot be sufficiently suppressed. On the other hand, if the magnetic flux density is too high, in a battery in which electrodes are laminated or in which components constituting the battery, such as the cathode, the separator, the anode and the like, are spirally wound, magnetic-field generation means provided on the respective anodes attract each other to reduce magnetic lines of force parallel to the plane of the electrodes, thereby reducing the effect of suppressing the deposition of dendritic lithium. Accordingly, the magnetic flux density on the surface of the prepared anode having the magnetic-field generation means is preferably 0.001–0.5 tesla (T), and more preferably, 0.003–0.2 tesla (T).

In the case of a lithium battery, it is desirable that materials constituting the battery are sufficiently dehydrated before being assembled in order to prevent reaction between lithium and water. The solvent used for preparing the above-described anode may, for example, be dehydrated using activated alumina, a molecular sieve, phosphorus pentoxide, calcium chloride or the like. In some cases, impurities and water are removed from a solvent by distilling the solvent in an inert gas under the coexistence of alkali metal.

The above-described solution containing the magnetic material may be coated, for example, using a coater or according to a screen printing method.

Anode-active-material holding material where an anode active material is deposited or intercalated during charging As the anode-active-material holding material shown in FIG. 2(a) or 204a shown in FIG. 2(b)) where an anode active material is deposited or intercalated during charging, a material where lithium is deposited or intercalated, such as lithium metal, a carbonous material including graphite, a metallic material, a transition-metal compound or the like, may be used for a lithium secondary battery. For example, a metallic material which forms an alloy with lithium, such as aluminum or the like, or a metal which has pores for receiving deposited lithium and also operates as a collector, such as porous nickel or the like, is suitable as the above-described anode-active-material holding material.

The anode-active-material holding material having the shape of a foil or a plate can be used without being modified. If the anode-active-material holding material is in the form of powder or fibers, the function of the anode can be obtained by preparing a paste-like coating agent by mixing the material in a binder, adding a conductive auxiliary material if necessary, and forming a coated film on the collector. A thin film of the anode-active-material holding material on the collector may also be formed by plating or a vapor deposition method. CVD, electron-beam deposition, sputtering or the like may be adopted as the vapor deposition method. Any anode for a lithium secondary battery must be sufficiently dried at a reduced pressure before being incorporated in the battery.

A carbonous material including graphite, a metallic material, a zinc foil or plate, a zinc film plated or deposited in vacuum on the collector, a coated film of a substance obtained by mixing zinc powder or zinc powder and zinc-oxide power in a binder (with a conductive auxiliary material if necessary) may be used as the anode-active-material holding material for a secondary battery using zinc as the anode active material.

Polymer material capable of passing ions relating to the battery reaction

In the anode having the structure shown in FIG. 2(b), a polymer having a molecular structure capable of passing ions, such as a macrocyclic compound, a polymer having a large intermolecular gap, such as rubber or the like, a polymer gel which receives a solvent by swelling, or the like may be used as the polymer capale of passing ions relating to the battery reaction, serving as a material constituting the magnetic-material layer. Even a polymer material incapable of passing ions relating to the battery reaction may be formed in a polymer film having pores capable of passing ions is dispersed, by adding a substance capable of being removed later, such as a substance to be thermally decomposed or capable of being dissolved, before forming the polymer film where the magnetic material is dispersed, and removing the added substance after the film has been formed.

Collector of the anode (200 shown in FIGS. 2(a) and 2(b))

The collector of the anode in the present invention has the role of efficiently supplying current consumed in the electrode reaction during charging and collecting generated current during discharging. Accordingly, a material which has a high electric conductivity and which is inert in the battery reaction is preferable as the material for forming the collector of the anode.

Nickel, titanium, copper, aluminum, stainless steel, platinum, palladium, gold, zinc, each kind of alloy, a composite metal including at least two of the above-described materials is preferable for the collector. However, in secondary batteries having a zinc anode, aluminum cannot be used without being modified because it is dissolved in an alkaline electrolyte solution. The collector may have the shape of a plate, a foil, a mesh, a sponge, fibers, a punching metal, an expanded metal or the like.

Cathode (102 shown in FIG. 1)

The cathode in the present invention comprises a collector, a cathode active material, a conductive auxiliary material, a binder and the like. The cathode is provided by forming a mixture of the cathode active material, the conductive auxiliary material, the binder and the like on the surface of the collector.

For example, graphite, carbon black, such as Ketjen black, acetylene black or the like, metallic fine powder made of nickel or the like, may be used as the conductive auxiliary material used in the cathode.

For example, polyorefin, such as polyethylene, polypropylene or the like, a fluororesin, such as polyvinylidene fluoride, a tetrafluoroethylene polymer or the like may be used when the electrolyte solution comprises a nonaqueous solvent, or an aqueous solution and polyvinyl alcohol, cellulose, polyamide or the like may be used when the electrolyte solution comprises an aqueous solution, as the binder for the cathode.

In lithium secondary batteries, a transistion-metal oxide, a transition-metal sulfide, a lithium-transition-metal oxide or a lithium-transition-metal sulfide is generally used as the cathode active material. For example, an element partially having d-shell or f-shell electrons, such as So, Y, a lanthanoide-series element, an actinoide element, Ti, Zr, Hf, V, Nb, Ta, Cr, Mo, W, Mn, To, Re, Fe, Ru, Os, Co, Rh, Ir, Ni, Pd, Pt, Cu, Ag or Au, may be used as the transition-metal element for the transition-metal oxide or the transition-metal sulfide. Particularly, a first-transition-series metal, such as Ti, V, Cr, Mn, Fe, Co, Ni or Cu, is preferably used.

In nickel-zinc secondary batteries, nickel hydroxide is used as the cathode active material.

In air-zinc secondary batteries, oxygen is used as the cathode active material, and the cathode comprises a collector, a catalyst and a water repellent material. For example, porous carbon, porous nickel, copper oxide or nickel oxide is used as the catalyst. A fluororesin, such as a porous tetrafluoroethylene polymer or polyvinylidene fluoride, is used as the water repellent material.

In zinc-bromine secondary batteries, bromine is used as the cathode active material.

Collector of the cathode

The collector of the cathode in the present invention has the role of efficiently supplying current consumed in the electrode reaction during charging and collecting generated current during discharging. Accordingly, a material which has a high electric conductivity and which is inert in the battery reaction is preferable as the material for forming the collector of the cathode.

Basically, the same material as that for the collector used in the anode is used. For example, nickel, titanium, aluminum, stainless steel, platinum, palladium, gold, zinc, each kind of alloy, a composite metal including at least two of the above-described materials is used. However, in secondary batteries having zinc, aluminum cannot be used without being modified because it is dissolved in an alkaline electrolyte solution. The collector may have the shape of a plate, a foil, a mesh, a sponge, fibers, a punching metal, an expanded metal or the like.

Separator (103 shown in FIG. 1)

The separator used in the present invention has the role of preventing short circuit between the anode and the cathode. It also has, in some cases, the role of holding the electrolyte solution.

The separator has pores where lithium ions in a lithium secondary battery, or hydroxyl ions or bromine ions in a zinc secondary battery can move, and must be insoluble in the electrolyte solution and be stable. Accordingly, for example, glass, polyolefin, such as polypropylene, polyethylene or the like, a fluororesin, polyamide or the like, is used as seperator material. These materials are preferably in the form of a nonwoven fabric cloth or micropore structure. A metal-oxide film having fine pores, or a composite resin film including a metal oxide may also be used. Particularly, a metal-oxide film having a multi-layer structure is effective for preventing short circuit because dendrite hardly passes therethrough. The use of a fluororesin film, serving as a flame retarding material, glass or a metal-oxide film, serving as an incombustible material, can improve safety.

Electrolyte (103 shown in FIG. 1)

The electrolyte in the present invention is used in one of the following three forms.

(1) A method of using it without being modified.

(2) A method of using it in the form of a solution dissolved in a solvent.

(3) A method of using it in a solidified state by adding a gelling agent, such as a polymer or the like in the solution.

An electryte liquid obtained by dissolving the electrolyte in a solvent is used in a state of being held in a porous separator.

The conductivity at 25° C. of the electrolyte or an electrolyte solution used in the present invention is preferably set to $1 \times 10^{-3}$ S/cm, and more preferably, to at least $5 \times 10^{-3}$ S/cm.

In lithium batteries using lithium as the anode active material, the following electrolyte and its solvent are preferably used.

As the electrolyte, for example, an acid, such as $H_2SO_4$, HCl, $HNO_3$ or the like, a salt comprising lithium ions ($Li^+$) and Lewis-acid ions ($BF_4^-$, $PF_6^-$, $AsFe_6^-$, $ClOhd\ 4^-$, $CF_3SO_3^-$, $BPh_4^-$ (Ph: phenyl radicals), or a salt obtained by mixing these materials may be used. A salt comprising cations, such as sodium ions, potassium ions, tetraalkylammonium ions or the like, and Lewis-acid ions may also be used. It is desirable that the above-described salts are subjected to sufficient dehydration and deoxidation, for example, by being heated at a reduced pressure.

As the solvent for the electrolyte, for example, acetonitrile, benzonitrile, propylene carbonate, ethylene carbonate, dimethyl carbonate, diethyl carbonate, dimethyl formamide, tetrahydrofuran, nitrobenzene, dichloroethane, diethoxyethane, 1, 2-dimethoxyethane, chlorobenzene, γ-butyrolactone, dioxolane, sulforan, nitromethane, dimethyl sulfide, dimethylsulfoxide, methylformate, 3-methyl-2-oxydazolydinone, 2-methyltetrahydrofuran, 3-propylsydonone, or a mixer solution of at least two of these agents may be used.

It is preferable that the solvent is used after removing water using activated alumina, a molecular sieve, phosphorus pentoxide, calcium chloride or the like, or, for some solvents, after removing impurities and water by being distilled in an inert gas under the coexistence with an alkali metal.

In nickel-zinc batteries or air-zinc batteries using zinc as the anode active material, the following materials are preferably used. As the electrolyte, for example, an alkali (such as potassium hydroxide, sodium hydroxide, lithium hydroxide or the like) is used.

In bromine-zinc batteries using zinc as the anode active material, a salt, such as zinc bromide or the like, is used.

In the batteries utilizing zinc, as the solvent of the above electrolytes, for example, water may be used.

In order to prevent leakage of the electrolyte solution, it is preferable to perform gelation as indicated in the above-described method (3). As the gelling agent, it is preferable to use a polymer which swells by absorbing the solvent of the electrolyte solution. As such a polymer, for example, polyethylene oxide, polyvinyl alcohol, polyacrylamide or the like, or a starch is used.

The shape and the structure of the battery

The secondary battery of the present invention may specifically have a flat shape (a flat-round shape or a coin-like shape), a cylindrical shape, a prismatic shape, a sheetlike shape or the like. The battery may have a monolayer structure, a multilayer structure, a spiral wound structure or the like. Among these types, spiral cylindrical batteries have the feature that, by inserting the separator between the anode and the cathode and winding the obtained structure, the area of the electrodes can be increased and a large current can be passed during charging/discharging. Batteries having the prismatic shape has the feature that the accommodating space in the device accommodating the secondary battery can be effectively utilized.

Figure 3:
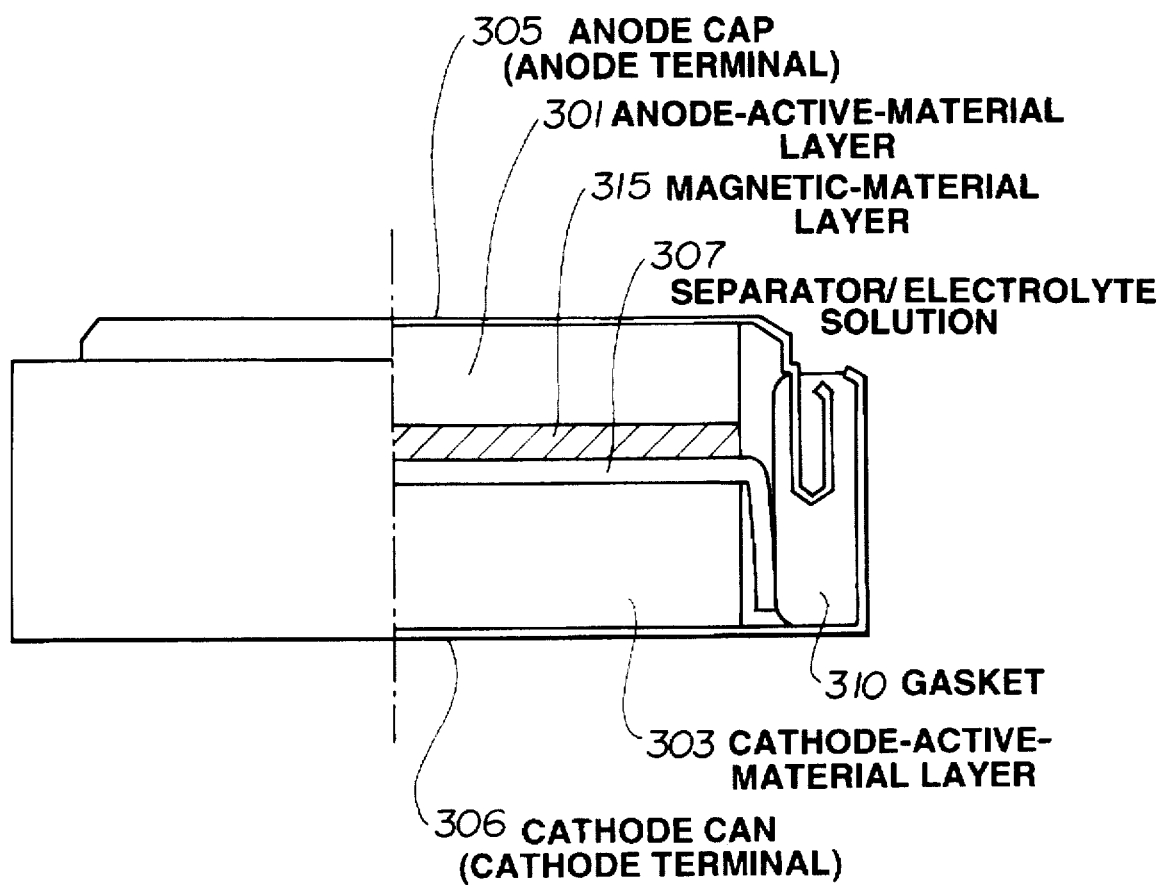
FIG. 3 is a cross-sectional view illustrating the configuration of an example of a monolayer flat battery according to the invention.
Figure 4:
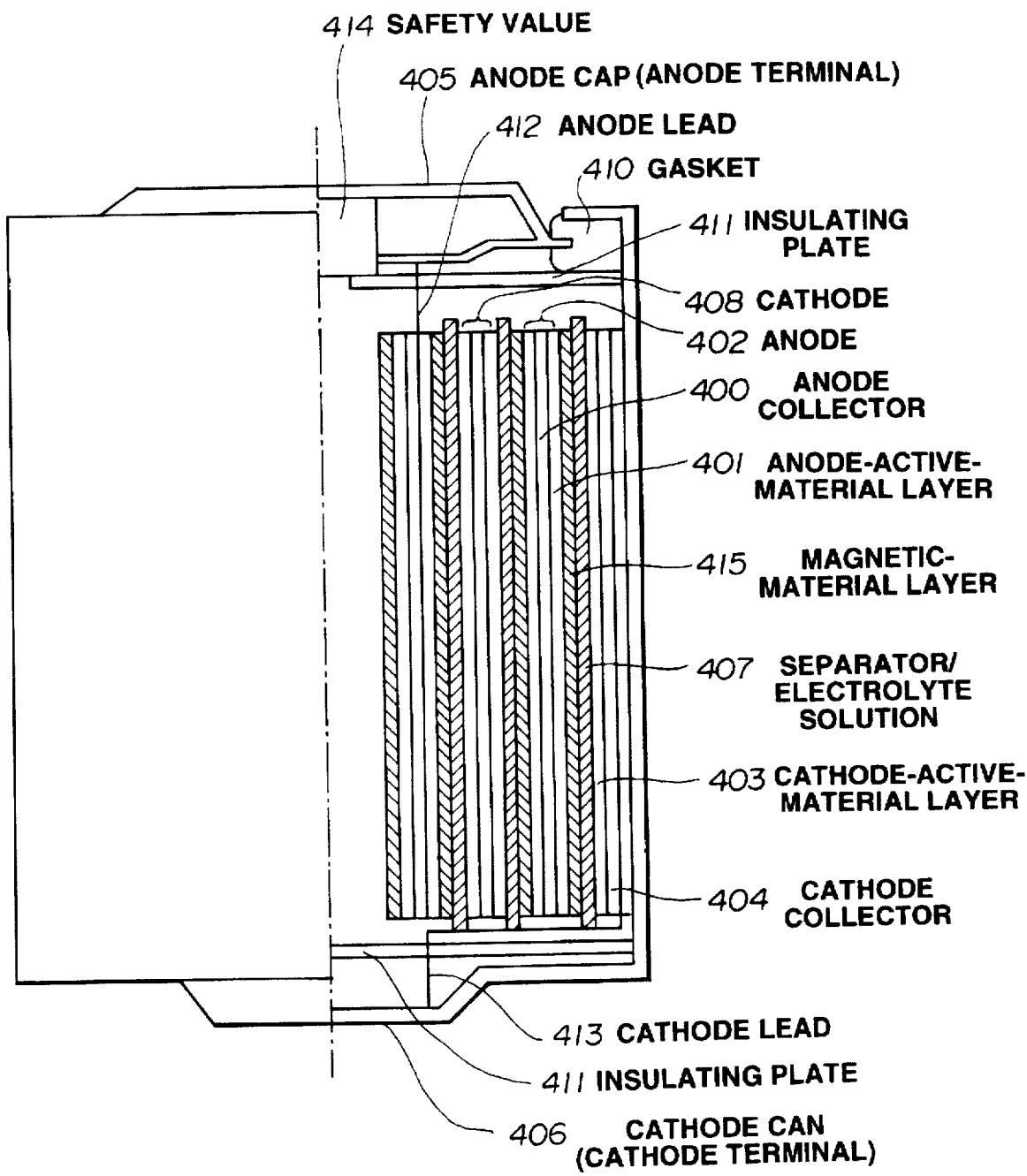
FIG. 4 is a cross-sectional view illustrating the configuration of an example of a spiral cylindrical battery according to the invention.

The shapes and the structures of secondary batteries of the present invention will now be described in detail with reference to FIGS. 3 and 4. FIG. 3 is a cross-sectional view illustrating the configuration of a monolayer flat-type (flat-round type) battery according to an embodiment of the present invention. FIG. 4 is a cross-sectional view illustrating the configuration of a spiral-type cylindrical battery according to another embodiment of the present invention.

In the secondary batteries shown in FIGS. 3 and 4, there are shown anode-active-material layers 301 and 401, cathode-active-material layers 303 and 403, anode caps (anode terminals) 305 and 405, cathode cans (cathode terminals) 306 and 406, separators/electrolyte solutions 307 and 407, gaskets 310 and 410, magnetic-material layers 315 and 415 for preventing short circuit due to dendrite, an anode collector 400, a cathode collector 404, an insulating plate 411, an anode lead 412, a cathode lead 413, and a safety valve 414.

In the flat-type secondary battery shown in FIG. 3, the cathode, including the cathode-active-material layer 303, and the anode, including the anode-active-material layer 301 and the magnetic-material layer 315, are laminated via the separator holding at least the electrolyte solution. This laminated member is accommodated within the cathode can 306, serving as the cathode terminal, from the cathode side, and the anode side is covered with the anode cap 305, serving as the anode terminal. The gasket 310 is disposed at other portions within the cathode can 306.

In the spiral cylindrical secondary battery shown in FIG. 4, the cathode 408, including the cathode-active-material layer 403 formed on the cathode collector 404, and the anode 402, including the anode-active-material layer 401 and the magnetic-material layer 415 formed on the anode collector 400, face each other via the separator 407 holding at least the electrolyte solution, to form a cylindrically-wound laminated member. This cylindrical laminated member is accommodated within the cathode can 406, serving as the cathode terminal. The anode cap 405, serving as the anode terminal, is provided at the opening side of the cathode can 406, and the gasket 410 is disposed at other portions within the cathode can 406. The safety valve 414 for adjusting the inner pressure within the battery is provided at the anode-cap side.

A description will now be provided of a method for assembling the batteries shown in FIGS. 3 and 4.

(1) The separator (307, 407) is inserted between the formed anode-active-material layer (301, 401) covered with the magnetic-material layer (315, 415) and the cathode-active-material layer (303,403), and the obtained member is incorporated within the cathode can (306,406).

(2) After injecting the electrolyte solution, the anode cap (305, 405) and the gasket (310, 410) are assembled.

(3) The battery is completed by calking the members assembled in process (2).

Particularly in the case of a lithium battery, it is desirable that the preparation of materials and the assembling of the battery are performed in a dry air where water is sufficiently removed, or in a dry inert gas.

A description will now be provided of the components in the above-described secondary batteries.

Gasket

As the material for the gasket (310, 410), for example, a fluororesin, a polyamide resin, a polysulfon resin, or each kind of rubber may be used. The battery may be sealed using glass sealing, adhesion by using an adhesive, welding, soldering or the like, in addition to the above-described calking using the gasket as shown in FIGS. 3 and 4.

As the material for the insulating plate 411 shown in FIG. 4, each kind of organic-resin material, or ceramic is used.

Battery housing/cathode can, anode cap

As the battery housing for accommodating the respective components in the secondary battery of the present invention, for example, the cathode can and the anode cap also have the role of respective electrode terminals of the battery. In the case of FIGS. 3 and 4, the cathode can (306, 406) and the anode cap (305, 405) are used as the battery housing also having the role of input/output terminals. As the material for the battery housing also having the role of input/output terminals, stainless steel is preferably used. Particularly, a titanium-clad stainless-steel plate, a copper-clad stainless-steel plate, a nickel-plated steel plate or the like is frequently used.

Particularly in the cases of FIGS. 3 and 4, since the cathode can (306, 406) also has the role of the battery housing, stainless steel is preferably used.

On the other hand, when the cathode can does not have the role of the battery housing, a metal, such as zinc or the like, a plastic, such as polypropylene or the like, or a composite material comprising a metal or glass fibers and plastic is used in addition to stainless steel as the material for the battery housing.

Since the secondary battery of the present invention incorporates magnetic-field generation means, it is desirable to provide a magnetic-shield material on the inner wall of the battery housing for the magnetic shielding.

Safety valve

The secondary battery of the present invention includes, for example, the safety valve 414 shown in FIG. 4 as safety means when the inner pressure of the battery increases. For example, rubber, a spring, a metallic ball, a rupture foil or the like may be used as the safety valve.

The present invention will now be described in detail with reference to experimental examples. However, the present invention is not limited to the following experimental examples.

EXPERIMENTAL EXAMPLE 1-1

In the present invention, coin-shaped lithium secondary batteries having a cross section as shown in FIG. 3 were manufactured. An anode whose surface is coated with a polymer film where magnetic-material powder for preventing internal short circuit due to the growth of dendritic lithium during charging is dispersed was used.

A description will now be provided of procedures for manufacturing respective components of the battery and assembling of batteries. All operations were performed in argon gas.

(1) Procedures for manufacturing the anode-active-material layer 301

The anode-active-material layer 301 was formed by cladding a metallic lithium foil on a copper expanded metal (corresponding to the collector).

(2) Coverage of the anode by a polymer film in which a magnetic material is dispersed 1) Polyethylene oxide and barium ferrite fine particles comprising mainly $BaO.6Fe_2O_3$ were mixed at a weight ratio of 40/60. After adding azobisisobutyronitrile and lithium tetrafluoroborate thereto, toluene was added to prepare a coating solution.

2) The coating solution prepared in process 1) was coated on the surface of the metallic lithium foil cladded on the copper expanded metal formed in process (1). The coated film was heated at 120° C. at a reduced pressure while irradiating ultraviolet rays to bridge and cure the coated polymer film.

3) A magnetic field was applied in a direction perpendicular to the surface of the metallic lithium foil obtained in process 2) using an electromagnet to magnetize the barium ferrite fine particles dispersed in the polyethylene oxide. Thus, the anode-active-material layer 301 made of the metallic lithium foil coated with the magnetic-material layer 315 comprising the polymer film in which the magnetic material s dispersed was obtained.

The magnetic flux density parallel to the plane of the anode formed in process 3) measured using a probe comprising a Hall element of a gauss meter was about 0.014 tesla. It was confirmed by the gauss meter that the magnetic lines of force parallel to the plane of the anode were orthogonal to the electric lines of force of the electric field between the anode and the cathode of the battery during charging.

(3) Procedures for manufacturing the cathode-active-material layer 303

1) Electrolytic manganese dioxide and lithium carbonate were mixed at a molar ratio of 1:0.4. The obtained mixture was heated at 800° C. to prepare a lithium-manganese oxide.

2) After mixing 3 weight % of acetylene-black carbon powder and 5 weight % of polyvinylidenefluoride powder in the lithium-manganese oxide prepared in process 1), N-methylpyrolidone was added.

3) After coating the paste obtained in process 2) on an aluminum foil and drying the coated film, the film was dried at 150° C. at a reduced pressure to prepare the cathode-active-material layer 303.

(4) Preparation of the electrolyte solution 307

1) Ethylene carbonate (EC) and dimethyl carbonate (DMC) of an equal amount from which water was sufficiently removed were mixed to prepare a solvent.

2) An electrolyte solution obtained by dissolving 1M (mol/l) of lithium tetrafluoroborate in the solvent obtained in process 1) was used.

(5) Separator 307

A micro-porous polyethylene film was used as a separator.

(6) Assembling of the battery

1) The separator 307 holding the electrolyte solution was inserted between the anode-active-material layer 301 coated with the magnetic-material layer 315 comprising a polymer film in which a magnetic material is dispersed, and the cathode-active-material layer 303, and the resultant member was incorporated into the cathode can 306 made of a titanium-clad stainless-steel material.

2) The gasket 310 made of polypropylene and the anode cap 305 made of a titanium-clad stainless-steel material were placed and caulked on the cathode can 306 obtained in process 1) to prepare a lithium secondary battery.

The performance of the obtained secondary batteries was evaluated with respect to the energy density per unit volume and the cycle life of the battery obtained in a charging/discharging cycle test.

The evaluation of the performance of the prepared batteries will now be described.

The cycle test was performed under the condition that a cycle comprises charging/discharging at a sufficiently large current density to facilitate the growth of dendrite of the anode active material during charging based on the capacity calculated from the cathode active material, i.e., 1 C (a current equal to capacity/time) and an interval of 30 minutes. The charging/discharging test of the battery was performed using HJ-106M made by Hokuto Denko Kabushiki Kaisha. The charging/discharging test was started from charging. The discharge capacity at the third cycle was defined as the battery capacity, and the number of cycles where the discharge capacity becomes less than 60% of the battery capacity was defined as the cycle life. In the case of a lithium battery, the cut-off voltage at charging was set to 4.5 V, and the cut-off voltage at discharging was set to 2.6 V.

The energy density per unit volume (Wh/l) was evaluated by a value of (an average operating voltage (V) x a discharging amount (Ah) in the above test/volume of the battery (l).

EXPERIMENTAL EXAMPLE 1-2

Experimental Example 1-2 differs from Experimental Example 1-1 in that an anode-active-material layer which is not coated with a polymer film where a magnetic material is dispersed was used for the anode. That is, in this example, the operation of coating a polymer film in which a magnetic material is dispersed performed in Experimental Example 1-1 was not performed.

Batteries were manufactured by the procedures except the process of coating the polymer in Experimental Example 1-1. The performance of the cycle life was evaluated.

Table 1 shows the results of the evaluation of the performance of the cycle life for the lithium secondary batteries manufactured in Experimental Examples 1-1 and 1-2. The results of the evaluation of the cycle life are indicated by normalizing the value of the Experimental Example 1-1 with the value of the Experimental Example 1-2, i.e., by obtaining the evaluation value of Experimental Example 1-1/the evaluation value of Experimental Example 1-2.

TABLE 1

|  | Experimental Example 1-1 | Experimental Example 1-2 |
|---|---|---|
| Cycle life | 1.3 | 1.0 |

Accordingly, it has become clear that the cycle life of the secondary battery having the layer where the magnetic material is dispersed provided on the anode in Experimental Example 1-1 is lengthened.

EXPERIMENTAL EXAMPLE 2-1

In this example, coin-shaped lithium secondary batteries having a cross section as shown in FIG. 3 were manufactured. Experimental Example 2-1 differs from Experimental Example 1-1 in that an aluminum foil coated with a polymer film in which a magnetic material is dispersed was used as the anode, and that a lithium-nickel oxide was used as the cathode active material. The same materials as in Experimental Example 1-1 were used for other components.

Procedures for manufacturing the anode and the cathode of the battery will now be described with reference to FIG. 3.

(1) Procedures for manufacturing the anode

1) The surface of an aluminum foil was etched by an aqueous solution of 5 weight % of potassium hydroxide. The solution was then neutralized by an aqueous solution of nitric acid, and the aluminum foil was washed in water. Then, the aluminum foil was subjected to electrolytic etching using an aqueous solution of hydrochloric acid as the electrolyte solution and glassy carbon as the facing electrode. The aluminum foil was then washed in water and dried at a reduced pressure, to prepare an aluminum foil having an increased surface area.

Lithium, serving as the anode active material, is deposited on the surface of the aluminum foil during charging to form an anode-active-material layer.

(2) Coverage of the anode with a polymer film in which a magnetic material is dispersed 1) Samarium-cobalt (SmCos) fine particles were mixed with polyvinyl alcohol containing photosensitive groups synthesized from polyvinyl alcohol and acetal including a styrilpyridinium salt at a weight ratio of 40/60. Ethanol was mixed with the resultant mixture to prepare a coating liquid.

2) The coating liquid prepared in process 1) was coated on the surface of the aluminum foil manufactured in process (1) using a spin coater. The coated film was dried at a reduced pressure, and was irradiated with ultraviolet rays to cross-link the coated polymer film.

3) By applying a magnetic field in a direction perpendicular to the plane of the aluminum foil obtained in process 2) using an electromagnet, the samarium-cobalt fine particles dispersed in polyvinyl alcohol were magnetized, to obtain an aluminum anode coated with the magnetic-material layer 315 comprising a polymer film in which a magnetic material is dispersed.

The magnetic flux density parallel to the plane of the anode formed in process 3) measured using a probe comprising a Hall element of a gauss meter was about 0.03 tesla.

(3) Procedures for manufacturing the cathode-active-material layer 303

1) Lithium nitrate and nickel carbonate were mixed at a molar ratio of 1:1. The obtained mixture was heated at 750° C. in an air flow, to prepare a lithium-nickel oxide.

2) After mixing 3 weight % of acetylene-black carbon powder and 5 weight % of polyvinylidenefluoride powder in the lithium-nickel oxide prepared in process 1), N-methyl-2-pyrolidone was added.

3) After coating the paste obtained in process 2) on an aluminum foil and drying the coated film, the film was dried at 150° C. at a reduced pressure to prepare the cathode-active-material layer 303.

The batteries were manufactured in the same manner as in Experimental Example 1-3 in other processes.

EXPERIMENTAL EXAMPLE 2-2

Experimental Example 2-2 differs from Experimental Example 2-1 in that an anode-active-material layer which is not coated with a polymer film where a magnetic material is dispersed was used for the anode. That is, in this example, the operation of coating a polymer film in which a magnetic material is dispersed performed in Experimental Example 2-1 was not performed.

Batteries were manufactured in the same manner as in Experimental Example 2-1 in other processes. The performance of the cycle life was evaluated for the secondary batteries obtained in Experimental Examples 2-1 and 2-2 as in the cases of Experimental Examples 1-1 and 1-2.

Table 2 shows the results of the evaluation of the performance of the cycle life for the lithium secondary batteries manufactured in Experimental Examples 2-1 and 2-2. The results of the evaluation of the cycle life are indicated by normalizing the value of Experimental Example 2-1 with the value of Experimental Example 2-2.

TABLE 2

|  | Experimental Example 2-1 | Experimental Example 2-2 |
|---|---|---|
| Cycle life | 1.4 | 1.0 |

Accordingly, it has become clear that the cycle life of the secondary battery having the layer where the magnetic material is dispersed provided on the anode in Experimental Example 2-1 is lengthened.

EXPERIMENTAL EXAMPLE 3-1

In this example, coin-shaped lithium secondary batteries having a cross section as shown in FIG. 3 were manufactured. Experimental Example 3-1 differs from Experimental Example 1-1 in that graphite which intercalates lithium between its layers during charging is used as the anode-active-material holding material and a magnetic material is dispersed in the anode while the anode is being formed, and that a lithium-cobalt oxide was used as the cathode active material. The same materials as in Experimental Example 1-1 were used for other components.

Procedures for manufacturing the anode and the cathode of the battery will now be described with reference to FIG. 3.

(1) Procedures for manufacturing the anode

1) After mixing 5 weight % of MnAlC fine particles, serving as a magnetic material, and 5 weight % of polyvinylidene fluoride in 90 weight % of natural graphite fine particles, N-methyl-2-pyrolidone was added to prepare a paste.

2) After coating the paste obtained in process 1) on a copper foil and drying the coated layer, the magnetic material MnAlC was magnetized by applying a magnetic field in a direction perpendicular to the plane of the copper foil using an electromagnet. Then, the coated layer was dried at 150° C. at a reduced pressure to provide an anode.

During charging, lithium is intercalated in the graphite to form the anode-active-material layer 301.

The magnetic flux density parallel to the plane of the anode formed in process 2) measured using a probe comprising a Hall element of a gauss meter was about 0.008 tesla.

(2) Procedures for manufacturing the cathode-active-material layer 303

1) Lithium carbonate and cobalt carbonate were mixed at a molar ratio of 1:2. The obtained mixture was heated at 800° C. in an air flow to prepare a lithium-cobalt oxide.

2) After mixing 3 weight % of acetylene-black carbon powder and 5 weight % of polyvinylidenefluoride powder in the lithium-cobalt oxide prepared in process 1), N-methyl-2-pyrolidone was added.

3) After coating the paste obtained in process 2) on a collector comprising an aluminum foil in the form of an expanded metal and drying the coated film, the film was dried at 150° C. at a reduced pressure to provide the cathode-active-material layer 303.

The batteries were manufactured in the same manner as in Experimental Example 1-1 in other processes.

EXPERIMENTAL EXAMPLE 3-2

Experimental Example 3-2 differs from Experimental Example 3-1 in that magnetic-material powder was not dispersed in the anode. Batteries were manufactured in the same manner as in Experimental Example 3-1 in other processes. The performance of the cycle life was evaluated for the secondary batteries obtained in Experimental Examples 3-1 and 3-2 as in the cases of Experimental Examples 1-1 and 1-2.

Table 3 shows the results of the evaluation of the performance of the cycle life for the lithium secondary batteries manufactured in Experimental Examples 3-1 and 3-2. The results of the evaluation of the cycle life are indicated by normalizing the value of Experimental Example 3-1 with the value of Experimental Example 3-2.

TABLE 3

|  | Experimental Example 3-1 | Experimental Example 3-2 |
|---|---|---|
| Cycle life | 1.4 | 1.0 |

Accordingly, it has become clear that the cycle life of the secondary battery having the anode where the magnetic material is dispersed in Experimental Example 3-1 is lengthened.

In Experimental Examples 1-1, 2-1 and 3-1, lithium-manganese oxide, lithium-nickel oxide and lithium-cobalt oxide are used, respectively. However, the present invention is not limited to these materials, but various kinds of cathode active materials, such as lithium-vanadium oxides, lithium-iron oxides and the like, may also be adopted. Although in the above-described examples, metallic lithium, aluminum and graphite are used as the anode, the present invention is not limited to these materials, but various kinds of carbonous materials obtained by baking organic resins, transition-metal oxides, transition-metal sulfides and the like may also be adopted.

Although only one kind of electrolyte solution is used for Experimental Examples 1-1, 2-1 and 3-1, the present invention is not limited to this solution.

The values of the energy density per unit volume of the secondary batteries of Experimental Examples 1-1, 1-2 and 1-3 normalized by making the evaluated energy density per unit volume of the secondary battery of Experimental Example to be 1.0 are about 1.8, 1.5 and 1.0, respectively.

The results of comparison of the energy density indicate that the secondary batteries of the Experimental Examples 1-1, 2-1 and 3-1 using the magnetic material have long cycle lifes and high energy densities.

EXPERIMENTAL EXAMPLE 4-1

In this example, coin-shaped nickel-zinc secondary batteries having a cross-section as shown in FIG. 3 were manufactured.

Procedures for manufacturing the respective components of the battery and assembly of the battery will now be described with reference to FIG. 3.

(1) Procedures for manufacturing the anode-active-material layer 301

1) A paste prepared by mixing 20 weight % of polyvinyl alcohol and 5 weight % of barium-ferrite fine particles mainly comprising $BaO.6Fe_2O_3$ with a mixture of zinc powder and zinc oxide powder, knealing the resultant mixture by adding water and adding succinic acid thereto was coated on both surfaces of a copper punching metal (corresponding to the collector), and the coated layer was dried. Then, the layer was heated to cause a cross-linking reaction of polyvinyl alcohol, and then washed and dried to obtain the anode-active-material layer 301. The obtained material was magnetized by applying a magnetic field in a direction perpendicular to the plane of the anode using an electromagnet.

The magnetic flux density parallel to the plane of the anode formed in process 1) measured using a probe comprising a Hall element of a gauss meter was about 0.009 tesla.

(2) Procedures for manufacturing the cathode-active-material layer 303

1) A paste was prepared by adding nickel powder to nickel hydroxide, adding carboxymethyl cellulose, serving as a binder, and water. The paste was filled in a nickel foamed member (Celmet/trade name, foamed material made by Sumitomo Electric Industries, Ltd.), and was dried and pressed to obtain the cathode-active-material layer 303.

(3) Preparation of the electrolyte solution 307

1) An aqueous solution of 30 weight % of potassium hydroxide to which lithium hydroxide was added was used.

(4) Separator 307

1) A separator 100 μm thick prepared by sandwiching a polypropylene nonwoven fabric cloth subjected to hydrophilic treatment by polypropylene films having fine pores subjected to hydrophilic treatment was used.

(5) Assembling of batteries

1) The separator 307 holding the electrolyte solution was inserted between the anode-active-material layer 301 and the cathode-active-material layer 303, and the resultant member was incorporated into the cathode can 306 made of a titanium-clad stainless-steel material.

2) The gasket 310 made of polypropylene and the anode cap 305 made of a titanium-clad stainless-steel material were placed and caulked on the cathode can 306 obtained in process 1) to provide a nickel-zinc secondary battery.

The performance of the obtained secondary batteries was evaluated with respect to the cycle life of the battery obtained in a charging/discharging cycle test.

The evaluation of the performance of the prepared batteries will now be described.

The cycle test was performed under the condition that a cycle comprises charging/discharging at 1 C (a current equal to capacity/time) based on the capacity calculated from the cathode active material, and an interval of 30 minutes. The charging/discharging test of the battery was performed using HJ-106M made by Hokuto Denko Kabushiki Kaisha. The charging/discharging test was started from charging. The discharge capacity at the third cycle was defined as the battery capacity, and the number of cycles where the discharge capacity becomes less than 60% of the battery capacity was defined as the cycle life. In the case of a nickel-zinc battery, the cut-off voltage at charging was set to 2.0 V, and the cut-off voltage at discharging was set to 0.9 V.

EXPERIMENTAL EXAMPLE 4-2

Experimental Example 4-2 differs from Experimental Example 4-1 in that magnetic power was not dispersed in the anode. Secondary batteries were manufactured in the same manner as in Experimental Example 4-1 in other processes. The performance of the cycle life was evaluated.

Table 4 shows the results of the evaluation of the performance of the cycle life for the nickel-zinc secondary batteries manufactured in Experimental Examples 4-1 and 4-2. The results of the evaluation of the cycle life are indicated by normalizing the value of Experimental Example 4-1 with the value of Experimental Example 4-2.

TABLE 4

|  | Experimental Example 4-1 | Experimental Example 4-2 |
|---|---|---|
| Cycle life | 1.4 | 1.0 |

Accordingly, it has become clear that the cycle life of the secondary battery having the anode where the magnetic material is dispersed in Experimental Example 4-1 is lengthened.

EXPERIMENTAL EXAMPLE 5-1

In the present example, coin-shaped air-zinc secondary batteries having a cross section as shown in FIG. 3 were manufactured.

A description will now be provided of procedures for manufacturing the respective components of the battery and assembly of the battery with reference to FIG. 3.

(1) Procedures for manufacturing the anode-active-material layer 301

1) After mixing 5 weight % of samarium cobalt (SmCos) fine particles and 5 weight % of polyvinylidene fluoride powder with a mixture of zinc powder and zinc oxide powder, N-methyl-2-pyrolidone was added to prepare a paste.

2) After coating the paste obtained in process 1) on a copper foil and drying the coated layer, the samarium cobalt was magnetized by applying a magnetic field in a direction perpendicular to the plane of the copper foil using an electromagnet. The layer was then dried at a reduced pressure at 150° C. to provide the anode.

The magnetic flux density parallel to the plane of the anode formed in process 2) measured using a probe comprising a Hall element of a gauss meter was about 0.021 tesla.

(2) Procedures for preparing the cathode

1) A paste obtained by mixing manganese dioxide, nickel oxide, cobalt oxide and tetrafluoroethylene polymer powder, and adding a xylene solution of 5 weight % of Super KONACF (a powder fluororesin paint made by Nippon Oil and Fats Co., Ltd.) thereto was coated on a nickel-plated copper mesh and cured at 170° C., and was then formed by being passed through a pressure heater roller, to obtain the cathode.

Air is diffused in the cathode during discharging, and oxygen, serving as an active material, reacts on the cathode.

(3) Preparation of the electrolyte solution 307

1) An aqueous solution of 30 weight % of potassium hydroxide to which lithium hydroxide was added was used.

(4) Separator 307

1) A separator 100 μm thick prepared by sandwiching a polypropylene nonwoven fabric cloth subjected to hydrophilic treatment by polypropylene films having fine pores subjected to hydrophilic treatment was used.

(5) Assembling of batteries

1) The separator 307 holding the electrolyte solution was inserted between the anode-active-material layer 301 and the cathode-active-material layer 303, and the resultant member was incorporated into the cathode can 306, having an air intake hole, made of a titanium-clad stainless-steel material in which air-diffusing paper and a polytetrafluoroethylene film were incorporated in advance.

2) The insulating packing 310 made of polypropylene and the anode cap 305 made of a titanium-clad stainless-steel material were placed and caulked on the cathode can 306 obtained in process 1) to provide an air-zinc secondary battery.

EXPERIMENTAL EXAMPLE 5-2

Experimental Example 5-2 differs from Experimental Example 5-1 in that magnetic power was not dispersed in the anode. Secondary batteries were manufactured in the same manner as in Experimental Example 5-1 in other processes. The performance or the cycle life of the batteries manufactured in Experimental Examples 6-1 and 5-2 was evaluated under the same conditions as in the nickel-zinc secondary batteries of Experimental Examples 4-1 and 4-2.

Table 5 shows the results of the evaluation of the performance of the cycle life for the air-zinc secondary batteries manufactured in Experimental Examples 5-1 and 5-2. The results of the evaluation of the cycle life are indicated by normalizing the value of Experimental Example 5-1 with the value of Experimental Example 5-2.

TABLE 5

|  | Experimental Example 5-1 | Experimental Example 5-2 |
|---|---|---|
| Cycle life | 1.3 | 1.0 |

Accordingly, it has become clear that the cycle life of the secondary battery having the anode where the magnetic material is dispersed in Experimental Example 5-1 is lengthened.

As described above, in the secondary battery of the present invention in which the anode active material comprises lithium or zinc, by adopting magnetic-field generation means, the growth of dendrite at the anode during charging causing degradation of the performance can be suppressed. Accordingly, by adopting the magnetic-field generation means, it is possible to provide lithium secondary batteries, nickel-zinc secondary batteries, air-zinc secondary batteries and the like having a long cycle life and a high energy density.

The individual components shown in outline in the drawings are all well known in the secondary battery arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A secondary battery including at least an anode, a cathode, an electrolyte and a battery housing, said battery comprising:

magnetic-field generation means for generating magnetic lines of force, orthogonal to an electric field during charging, at least on the surface of the anode.

2. A secondary battery according to claim 1, wherein said magnetic-field generation means comprises a magnetized magnetic material.

3. A secondary battery according to claim 2, wherein said magnetic material is dispersed within the anode.

4. A secondary battery according to claim 2, wherein the anode comprises a member holding an anode active material provided on a collector, said magnetic material, serving as said magnetic-field generation means, and a binder.

5. A secondary battery according to claim 2, wherein said magnetic material is disposed at a side of the surface of the anode where the electrolyte is provided.

6. A secondary battery according to claim 2, wherein said magnetic material is dispersed in a polymer material capable of passing ions relating to a battery reaction.

7. A secondary battery according to claim 6, wherein said polymer material comprises at least one kind of material selected from a group consisting of macrocyclic compounds, rubber materials and polymer gel materials.

8. A secondary battery according to claim 2, wherein said magnetic material comprises a permanent magnet material.

9. A secondary battery according to claim 8, wherein said permanent magnet material comprises at least one kind of material selected from a group consisting of rare-earth magnets, ferrite magnets, alnico magnets, Fe-Cr-Co magnets, MnAlC magnets and Fe-Pt magnets.

10. A secondary battery according to claim 1, wherein the anode of said secondary battery during charging contains at least a lithium element.

11. A secondary battery according to claim 1, wherein the anode of said secondary battery during charging contains at least a zinc element.

12. A secondary battery according to claim 1, wherein the material constituting the anode is selected from a group consisting of carbon materials, metallic materials and transition-metal compounds.

13. A secondary battery according to claim 1, wherein a laminated member obtained by laminating the cathode and the anode via a separator holding the electrolyte has a flat shape accommodated within the battery housing comprising a cathode can, serving as a terminal of the cathode, and an anode cap, serving as a terminal of the anode.

14. A secondary battery according to claim 1, wherein a cylindrical laminated member obtained by laminating and winding the cathode and the anode via a separator holding the electrolyte has a cylindrical shape accommodated within the battery housing comprising a cathode can, serving as a terminal of the cathode, and an anode cap, serving as a terminal of the anode.

15. A method for manufacturing a secondary battery including at least an anode, a cathode, an electrolyte and a battery housing, said method comprising the steps of:

mixing a magnetic material with an anode material and forming the resultant material to form the anode;

forming the cathode; and disposing the anode obtained in said anode forming step, the cathode obtained in said cathode forming step, and the electrolyte within the battery housing.

16. A method for manufacturing a secondary battery including at least an anode, a cathode, an electrolyte and a battery housing, said method comprising the steps of:

forming the anode;

forming a layer made of a magnetic material on the anode;

forming the cathode; and disposing the anode including the layer made of the magnetic material obtained in said layer forming step, the cathode obtained in said cathode forming step, and the electrolyte within the battery housing.

* * * * *

UNITED STATES PATENT AND TRADEMARK OFFICE
CERTIFICATE OF CORRECTION

PATENT NO. : 5,728,482

DATED : March 17, 1998

INVENTOR(S) : SOICHIRO KAWAKAMI ET AL.

It is certified that error appears in the above-identified patent and that said Letters Patent is hereby corrected as shown below:

Title page,
AT [56] REFERENCES CITED

FOREIGN PATENT DOCUMENTS

"05140785 6/1993 Japan" should read
--5-140785 6/1993 Japan--.

IN THE DRAWINGS

Sheet 7, FIG. 9, "DE POWER" should read --DC POWER--.

COLUMN 1

Line 48, "1/6" should read --1/6 of a-- and
"atom at most," should read --atom,--;
Line 52, "amount of" should be deleted;
Line 57, "cases, finally being liable to cause" should read
--cases. The dendritic lithium may cause--; and
Line 64, "performed;" should read --performed.--.

COLUMN 2

Line 7, "on" should read --with--;
Line 9, "film, or" should read --film. Often--;
Line 14, "circuit" should read --circuits--;
Line 16, "lithim" should read --lithium--;
Line 21, "Anyway, a" should read --In either case,-- and
"a" (second occurrence) should be deleted--;
Line 25, "solution" should read --solution,--; and
Line 59, "also," should be deleted.

UNITED STATES PATENT AND TRADEMARK OFFICE
CERTIFICATE OF CORRECTION

PATENT NO. : 5,728,482

DATED : March 17, 1998

INVENTOR(S) : SOICHIRO KAWAKAMI ET AL.    Page 2 of 3

It is certified that error appears in the above-identified patent and that said Letters Patent is hereby corrected as shown below:

COLUMN 4

Line 30, "on" (second occurrence) should read --with--;
Line 35, "on" should read --with--; and
Line 46, "a repetion of" should be deleted.

COLUMN 5

Line 21, "805" should read --505--.

COLUMN 7

Line 10, "in" should read --in an--; and
Line 44, "$Fe_46Cr_{31}Co_{23}$" should read --$Fe_{46}Cr_{31}Co_{23}$--.

COLUMN 8

Line 29, "and" should read --and 2(b).--.

COLUMN 9

Line 40, "carbonous material" should read
        --carbonous material (a carbon material)--.

COLUMN 10

Line 10, "capale" should read --capable--; and
Line 49, "polyorefin," should read --polyolefin,--.

COLUMN 12

Line 3, "ClOhd 4⁻," should read --$ClO_4^-$,--; and
Line 19, "mixer" should read --mixed--.

UNITED STATES PATENT AND TRADEMARK OFFICE
CERTIFICATE OF CORRECTION

PATENT NO. : 5,728,482

DATED : March 17, 1998

INVENTOR(S) : SOICHIRO KAWAKAMI ET AL.

It is certified that error appears in the above-identified patent and that said Letters Patent is hereby corrected as shown below:

<u>COLUMN 14</u>

Line 65, "s" should read --is--.

<u>COLUMN 17</u>

Line 25, "Experimental Example 1-3," should read
       --Experimental Example 1-1--.

<u>COLUMN 18</u>

Line 28, "air flow" should read --airflow--.

<u>COLUMN 19</u>

Line 24, "lifes" should read --lives--.

<u>COLUMN 21</u>

Line 55, ".same" should read --same--; and
    Line 58, "Experimental Examples 6-1" should read
       --Experimental Examples 5-1--.

Signed and Sealed this

Fifteenth Day of December, 1998

*Attest:*

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO.    : 5,728,482
DATED         : November 9, 1999
INVENTOR(S)   : Soichiro Kawakami et al.

It is certified that error appears in the above-identified patent and that said Letters Patent is hereby corrected as shown below:

<u>Title page,</u>
Item [56], *Attorneys, Agent or Firm,*
Insert: -- Fitzpatrick, Cella, Harper & Scinto --.

Signed and Sealed this

Twenty-sixth Day of February, 2002

Attest:

JAMES E. ROGAN
*Attesting Officer*   *Director of the United States Patent and Trademark Office*

REEXAMINATION CERTIFICATE (3929th)

United States Patent [19]
Kawakami et al.

[11] B1 5,728,482
[45] Certificate Issued Nov. 9, 1999

[54] SECONDARY BATTERY AND METHOD FOR MANUFACTURING THE SAME

[75] Inventors: Soichiro Kawakami; Naoya Kobayashi, both of Nara; Masaya Asao, Tsuzuki-gun, all of Japan

[73] Assignee: Canon Kabushiki Kaisha, Tokyo, Japan

Reexamination Request:
No. 90/005,260, Feb. 12, 1999

Reexamination Certificate for:
Patent No.: 5,728,482
Issued: Mar. 17, 1998
Appl. No.: 08/770,802
Filed: Dec. 20, 1996

Certificate of Correction issued Dec. 15, 1998.

[30] Foreign Application Priority Data
Dec. 22, 1995 [JP] Japan ................................ 7-349549

[51] Int. Cl.$^6$ .................................................... H01M 4/62
[52] U.S. Cl. .................... 429/10; 429/218.1; 29/623.1
[58] Field of Search ................................. 429/10, 218.1; 29/623.1

[56] References Cited

U.S. PATENT DOCUMENTS 3,597,278  8/1971  VonBrimer ............................. 136/136
5,051,157  9/1991  O'Brien ................................ 204/129.1

FOREIGN PATENT DOCUMENTS 1335442  5/1995  Canada .

*Primary Examiner*—S. J. Kalafut

[57] ABSTRACT

In a secondary battery including at least an anode, a cathode, an electrolyte and a battery housing, a magnetic-field generation unit for generating magnetic lines of force, orthogonal to an electric field during charging, at least on the surface of the anode is provided.

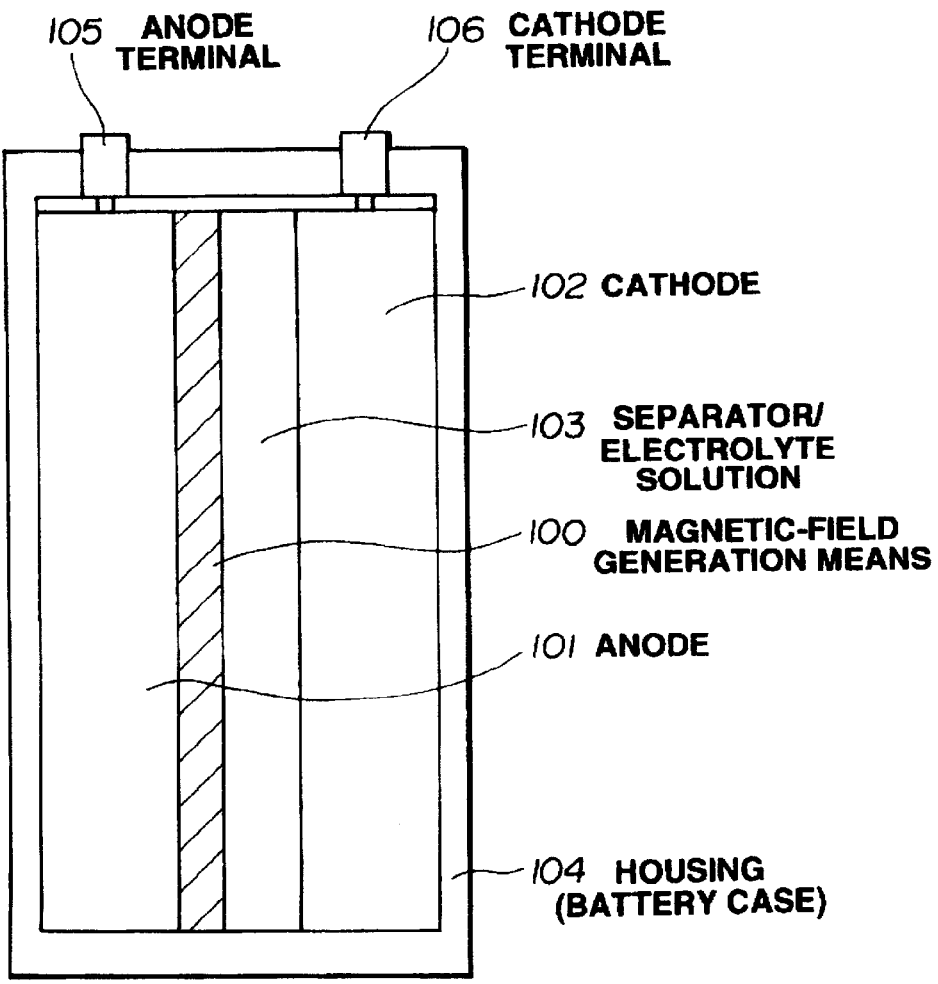

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 11, lines 58–60:

An [electryte] *electrolyte* liquid obtained by dissolving the electrolyte in a solvent is used in a state of being held in a porous separator.

Column 12, lines 11–20:

As the solvent for the electrolyte, for example, acetonitrile, benzonitrile, propylene carbonate, ethylene carbonate, dimethyl carbonate, diethyl carbonate, dimethyl formamide, tetrahydrofuran, nitrobenzene, dichloroethane, diethoxyethane, 1, 2-dimethoxyethane, chlorobenzene, γ-butyrolactone, dioxolane, sulforan, nitromethane, dimethyl sulfide, dimethylsulfoxide, methylformate, 3-methyl-2-[oxydazolydinone] *oxydiazolydinone*, 2-methyltetrahydrofuran, 3-propylsydonone, or a mixed solution of at least two of these agents may be used.

AS A RESULT OF REEXAMINATION, IT HAS BEEN DETERMINED THAT:

The patentability of claims 15 and 16 is confirmed.

Claims 2, 3 and 5 are cancelled.

Claims 1, 4, 6 and 8 are determined to be patentable as amended.

Claims 7 and 9–14, dependent on an amended claim, are determined to be patentable.

1. A secondary battery *subject to growth of dendrites of anode active material during operation* including at least an anode, a cathode, an electrolyte and a battery housing, said battery comprising:
[magnetic-field generation means] *particulate magnetized magnetic material dispersed on the surface of or within the anode* for generating magnetic lines of force, orthogonal to an electric field during charging, at least on the surface of the anode *to suppress the growth of said dendrites*.

4. A secondary battery according to claim [2] *1*, wherein the anode comprises a member holding an anode active material provided on a collector, said magnetic material, [serving as said magnetic-field generation means,] and a binder.

6. A secondary battery according to claim [2] *1*, wherein said magnetic material is dispersed in a polymer material capable of passing ions relating to a battery reaction.

8. A secondary battery according to claim [2] *1*, wherein said magnetic material comprises a permanent magnetic material.

* * * * *